US007957515B1

(12) United States Patent
Weiss

(10) Patent No.: US 7,957,515 B1
(45) Date of Patent: Jun. 7, 2011

(54) SELECTIVE TELEPHONE BLOCKER WITH TIMER

(76) Inventor: Jeffrey N. Weiss, Parkland, FL (US)

( * ) Notice: Subject to any disclaimer, the term of this patent is extended or adjusted under 35 U.S.C. 154(b) by 2808 days.

(21) Appl. No.: 09/848,753

(22) Filed: May 3, 2001

Related U.S. Application Data

(63) Continuation of application No. 09/728,233, filed on Dec. 1, 2000, now abandoned.

(60) Provisional application No. 60/192,297, filed on Mar. 27, 2000.

(51) Int. Cl.
*H04M 3/42* (2006.01)
(52) U.S. Cl. .............................. 379/210.02; 379/373.01
(58) Field of Classification Search ............ 379/210.02, 379/373.01, 373.03, 142.01, 142.05, 142.06, 379/142.07
See application file for complete search history.

(56) References Cited

U.S. PATENT DOCUMENTS

| | | | | | |
|---|---|---|---|---|---|
| 4,266,098 | A | * | 5/1981 | Novak | 179/5 |
| 4,821,312 | A | * | 4/1989 | Horton et al. | 379/102 |
| 4,850,013 | A | * | 7/1989 | Rose | 379/199 |
| 4,924,496 | A | * | 5/1990 | Figa et al. | 379/142 |
| 5,467,388 | A | * | 11/1995 | Redd, Jr. et al. | 379/196 |
| 5,604,791 | A | * | 2/1997 | Lee | 379/142 |
| 6,298,122 | B1 | * | 10/2001 | Horne | 379/93.09 |

* cited by examiner

*Primary Examiner* — William J Deane
(74) *Attorney, Agent, or Firm* — Daniel S. Polley, P.A.

(57) ABSTRACT

Disclosed is a selective telephone call blocker, preferably with timer. The user preferably sets the current time and one or more beginning and ending time periods during which the call block feature is active. The user then selects, one or more codes, such as two letter or number code(s). During the period of time in which the call block feature is active the device will automatically ask the caller to enter the code in order for the call to be completed. If the correct code is entered within a preset time period the call will be transmitted to the telephone or answering machine. If an incorrect code or no code is entered, the invention preferably repeats the request for correct code entry. If within a next preset time period the correct code is not entered the call will be disconnected. Preferably, the call block feature is not operational if the receiving phone is in use. In this case, the calling party will get a busy signal if the receiving party does not have a call waiting feature. If the receiving party does have a call waiting feature, then it is the option of the receiving party to acknowledge the receipt of the telephone call. The device is compatible with existing telephone devices and can be connected between the standard telephone wall outlet and a telephone set with or without an answering machine. Alternatively, the blocker can be connected at the portion of the phone line before the phone line diverges into multiple lines.

13 Claims, 8 Drawing Sheets

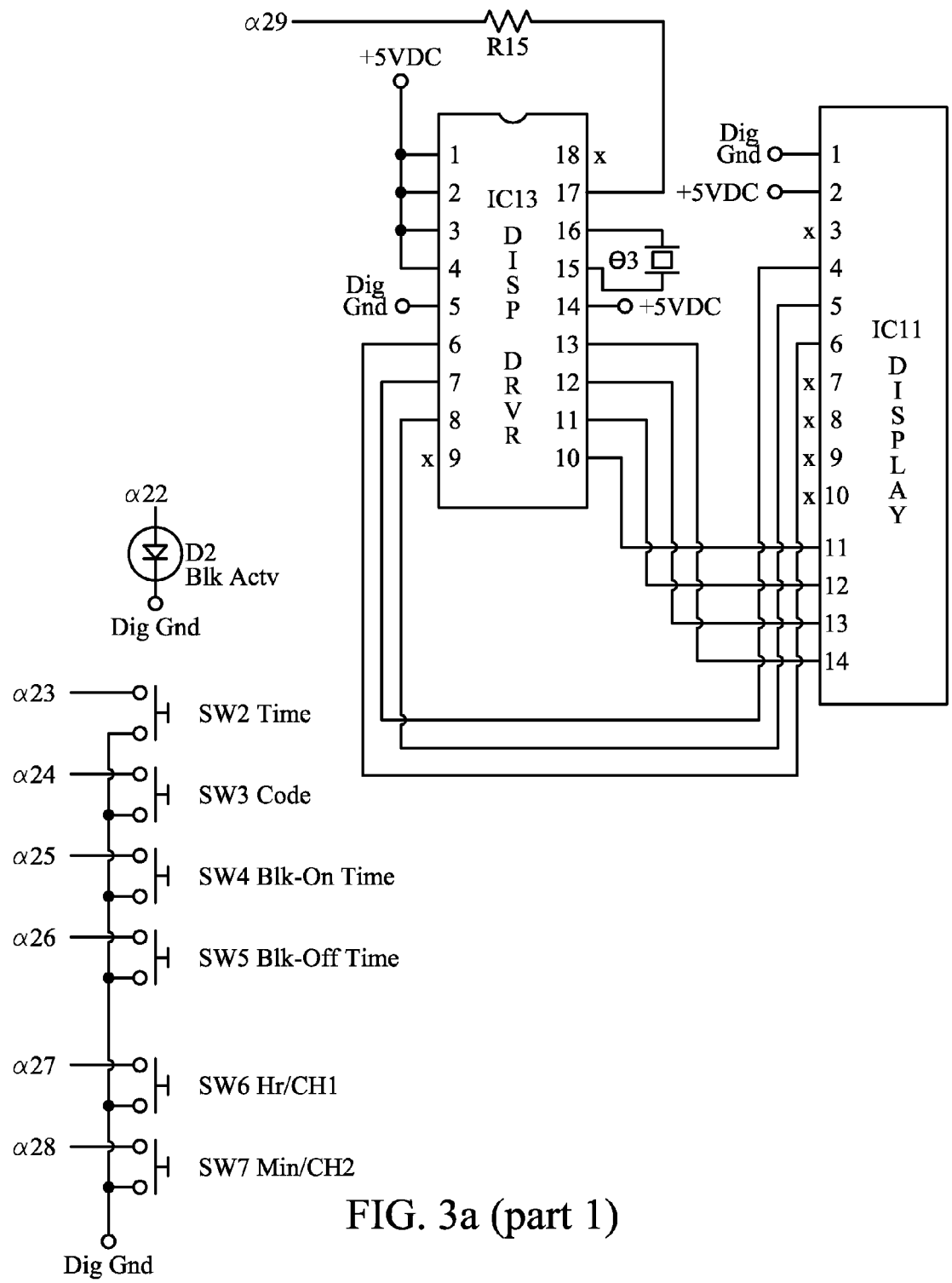
FIG. 3a (part 1)

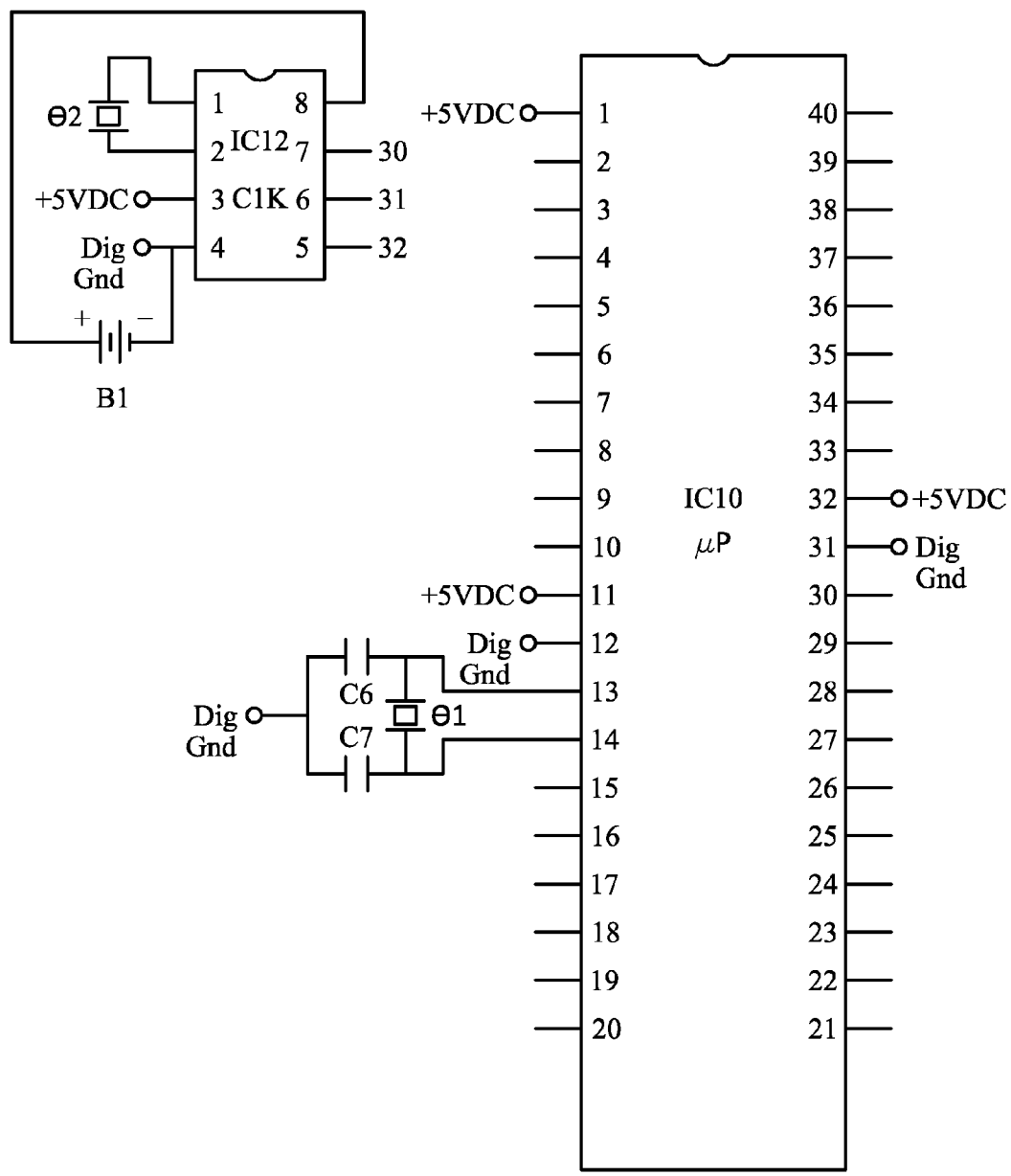
FIG. 3a (part 2)

| DESIGNATION | DESCRIPTION | PART# | SOURCE |
|---|---|---|---|
| P1 | Power Brick 5v 1a | T310 | A |
| C1 | 470uE | 4107PHCT | A |
| IC1 | Line Cd Acc Sw (Lucent) | ATTL7583BF | B |
| Z1 Z4 Z5 | Surge Abs 450v 2500a | P7257 | A |
| CN1 | Power Jack | CP-3504 | A |
| CN2 CN3 | Telco Mod Connector | A9077 | A |
| D1 D3 | 1N4004 | IN4004DICT | A |
| R1 | 5.1K 2w | P5.1KW-2BK | A |
| C2 | 100uf | 4126PHCT | A |
| R2 | 510 | | |
| Z2 Z6 Z7 | 4.7v 0.5w | 1N5230BMSCT | A |
| R3 | 1.5K | | |
| IC2 IC7 IC8 | SS Iso Rly (Clare) | CLA108 | A |
| IC3 IC4 | SS Iso Rly (Clare) | 252-004 | C |
| Z3 | 51v 1w | 1N4757AMSCT | A |
| R5 R6 | 10 | | |
| C3 C5 | 0.47uf | P4967 | A |
| R7 R8 R9 | 100K | | |
| C4 | 0.001uf | P4898 | A |
| IC5 | Voice Device (ISD) | ISD142OP | A |
| CN4 | (Opt) Gnd Post | | |
| T1 | Xfmr 600:600 | 10624 | A |
| IC6 | SS Rly Sw (Clare) | 252-001 | C |
| SP1 | Speaker | P9613 | A |
| R10 R13 R14 | 300 | | |
| R11 R12 | 5.1K | | |
| IC9 | DTMF Rcvr (Motorola) | MC145436AP | C |
| SW1 | SPST | CKN1004 | A |
| IC10 | uP (Microchip) | PIC16F877 | D |
| IC11 | Display (Seiko M16410A) | 6529-OP | E |
| D2 | LED | MR335OQT | A |
| SW2, 3, 4, 5, 6, 7 | SPST-NO | P8076SCT | A |
| IC12 | Clock | DS1302 | F |
| IC13 | Display Driver | EDE702 | G |
| O1 O3 | Xtal 4MHz | CTX-006 | A |
| O2 | Xtal 32.768KHz | X801 | A |
| B1 | Battery 3v Li | P183 | A |
| C6 C7 | 15pf | P40114A | A |
| R15 | 33K | | |

OTHER MISC PARTS

Printed Circuit Board
Panel/Box
Bypass Capacitors
Test Points
Display Connector
IC Sockets (8, 14, 14, 18, 24, 28, 40 pin DIP)

FIG. 3B

SOURCE REFERENCES

| | | |
|---|---|---|
| | Digi Key | A |
| | Lucent | B |
| | Allied | C |
| | Microchip | D |
| | MP Jones Assoc | E |
| | Dallas Semiconductor | F |
| | E-Lab | G |

ALPHA REFERENCES (Microprocessor Digital I/O)

| ALPHA REFERENCES | | |
|---|---|---|
| 1 2 3 | Line Access Sw Control | DO |
| 4 | Ring Detect | DI |
| 5 | Play Voice | DO |
| 6 7 8 9 10 11 | Voice Address | DO |
| 12 | Hook Detect | DI |
| 13 | Answer Detect | DI |
| 14 15 16 17 | DTMF Data | DI |
| 18 | DTMF Valid Data | DI |
| 19 | Speaker Switch | DO |
| 20 | Answer1 | DO |
| 21 | Answer2 | DO |
| 22 | Blocking Active | DO |
| 23 24 25 26 27 28 | Push Button Inputs | DI |
| 29 | Display | DO |
| 30 31 32 | Clock I/F | DI / DO |

FIG. 3C

SELECTIVE TELEPHONE BLOCKER WITH TIMER

This application is a continuation of U.S. application Ser. No. 09/728,233, filed Dec. 1, 2000, now abandoned which claims the benefit of Provisional Application No. 60/192,297, filed Mar. 27, 2000.

This invention was disclosed in the Disclosure Documents Program of the U.S. Patent and Trademark Office on May 5, 1999, Disclosure Document No. 456060.

BACKGROUND OF THE INVENTION

1. Field of the Invention

This invention relates to telephone accessories, and in particular, to a method for automatically and selectively screening incoming telephone calls. The user may program the device such that the screening of the incoming telephone calls occurs only during set time intervals, i.e., when the user is sleeping. The call blocking feature is preferably preprogrammed by the user with a code, such as, but not limited to, a two letter or two digit code (i.e., the initials of the users first and last name), that must be entered by the caller so that the call is transmitted through the telephone blocker.

2. Description of Related Art

Unsolicited telephone calls are a nuisance and are increasing in frequency. Many of the calls originate from businesses promoting a product, non-mainstream charities or wrong numbers. If the telephone call occurs when a person is present it will interrupt another activity, i.e., eating, sleeping, etc. and often elicit stress and annoyance.

Attempts have been made to mitigate the impact of nuisance telephone calls. One technique is to obtain an unlisted telephone number. However, the telephone company charges a monthly fee for this service and desired calls may be lost because the party attempting to call cannot obtain the telephone number. Unfortunately, with normal usage the telephone number will eventually be known by many parties and may be sold to telephone solicitation companies. Automatic telephone calling devices frequently used for telephone solicitation are unaffected by the unlisting of the telephone number.

Another technique for mitigating unwanted telephone calls is to use a calling party identification detector service or device to identify the calling party. This technique is of limited usefulness as the subscriber must remember a large body of telephone numbers assuming that the party one does want to speak to is calling from a recognizable telephone number. A monthly fee is generally charged for this service and it is ineffective if the calling party has a call block feature.

A relatively inexpensive method for screening unwanted telephone calls is to use a telephone answering machine. The disadvantages of this technique is that the telephone still rings and disturbs the subscriber who must listen to the message being left on the machine to determine if this is a call they wish to receive. If the ringer is turned off then important calls may be missed. In addition, some people are frightened by answering machines and do not want to leave messages.

It is therefore to the effective resolution of the aforementioned problems and shortcomings that the present invention is directed.

BRIEF SUMMARY OF THE INVENTION

In one illustrative embodiment of the invention the device contains message and clock circuitry. The user can set the current time, day, date, etc. by pressing buttons on the case containing the electronics. The user then sets the beginning and ending time during which the call block feature is active. The user then selects a two letter or number code. The code can also consist of more than two letter or numbers and can consist of a combination of number(s) and letter(s). During the period of time in which the call block feature is active the device will automatically ask the caller to enter the code in order for the call to be completed. If the correct code is entered within a preset time period, such as, but not limited to, 15 seconds of the request for code entry, the call will be transmitted to the telephone or answering machine. If an incorrect code or no code is entered, the invention will repeat the request for correct code entry. If within the next preset time period, such as, but not limited to, another 15 seconds the correct code is not entered, the call will be disconnected. The call block feature is not operational if the receiving phone is in use. In this case, the calling party will get a busy signal if the receiving party does not have a call waiting feature. If the receiving party does have a call waiting feature, then it is the option of the receiving party to acknowledge the receipt of the telephone call. The device is compatible with existing telephone devices and can be connected between the standard telephone wall outlet and a telephone set with or without an answering machine.

Where multiple phones are located in the dwelling, preferably the ringers for all phones not associated with the blocker would be turned off. Alternatively, the blocker can be connected at the portion of the phone line before the phone line diverges into multiple lines, such as, but not limited to, one for each phone in the dwelling.

Accordingly, it is an object of this invention to provide a device that selectively screens telephone calls by using a code, programmed by the user, that the caller must enter for the telephone call to be transmitted through the call blocker.

It is another object of the invention to provide a timer which may be set by the user, such that the call blocker feature is active only during a set time interval, or can be left on indefinitely.

It is still another object of this invention to provide a device that is easy to use.

It is yet another object of this invention to provide a device that is compatible with current telephone equipment.

In accordance with these and other objects which will become apparent hereinafter, the instant invention will now be described with particular reference to the accompanying drawings.

BRIEF DESCRIPTION OF THE SEVERAL VIEWS OF THE DRAWINGS

The invention may be better understood by reference to the drawings in which:

FIG. 3 is a diagram/schematic of certain components of the preferred embodiment for the present invention.

DETAILED DESCRIPTION OF THE INVENTION

Figure 1:
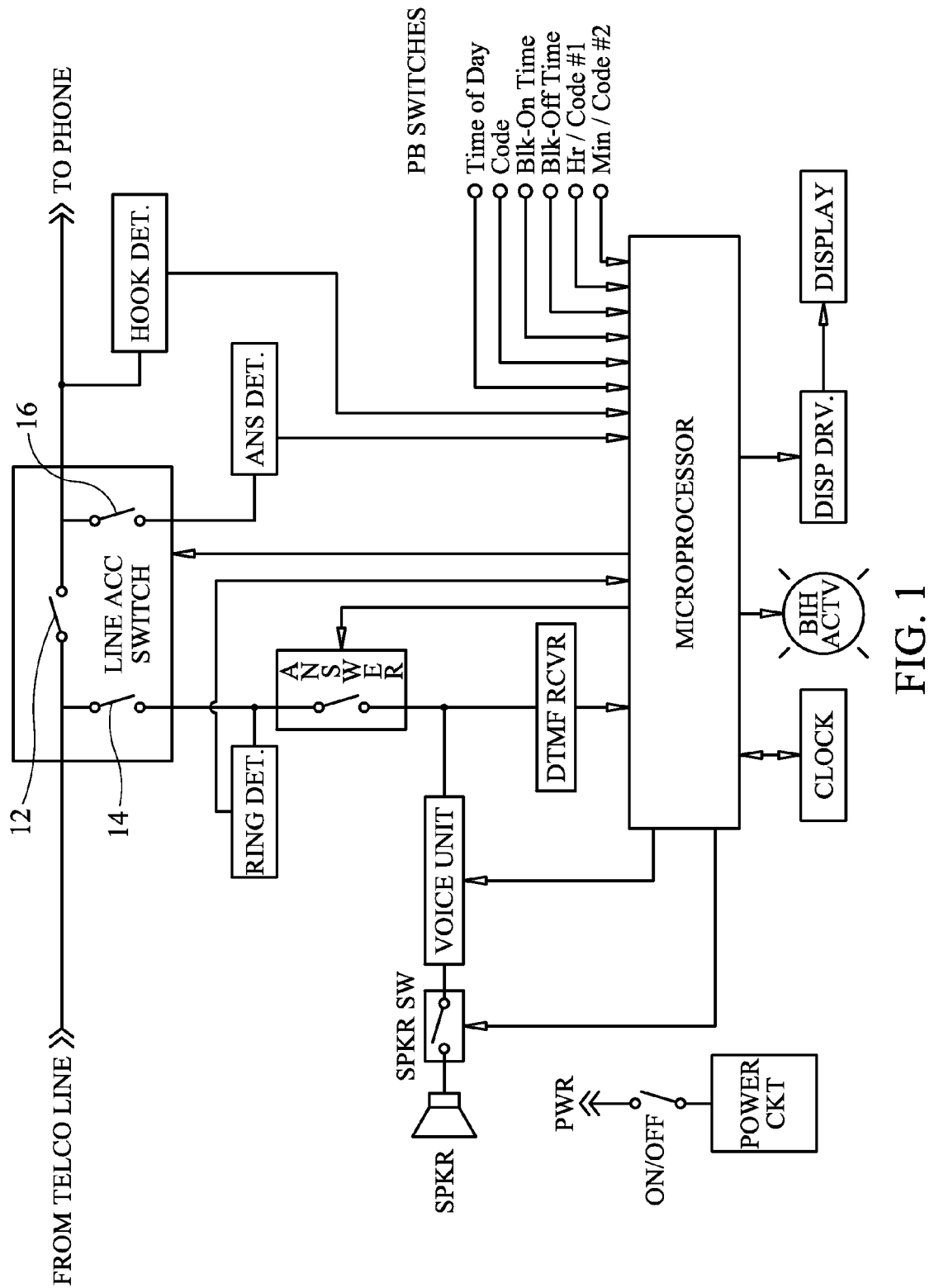
FIG. 1 is a block diagram of the preferred embodiment for the present invention.
Figure 2A:
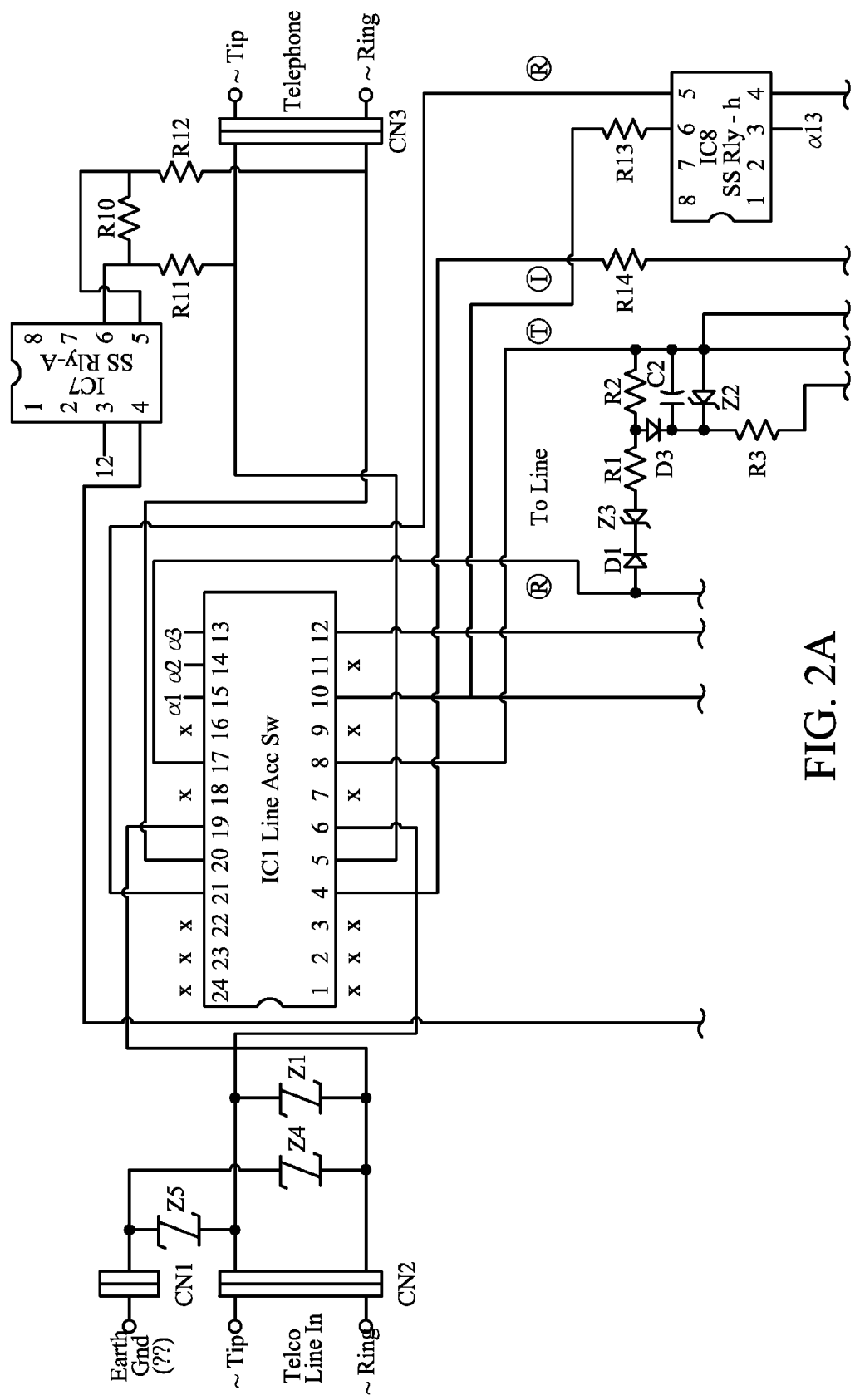
FIG. 2 is an electrical schematic of the preferred embodiment for the present invention.
Figure 2B:
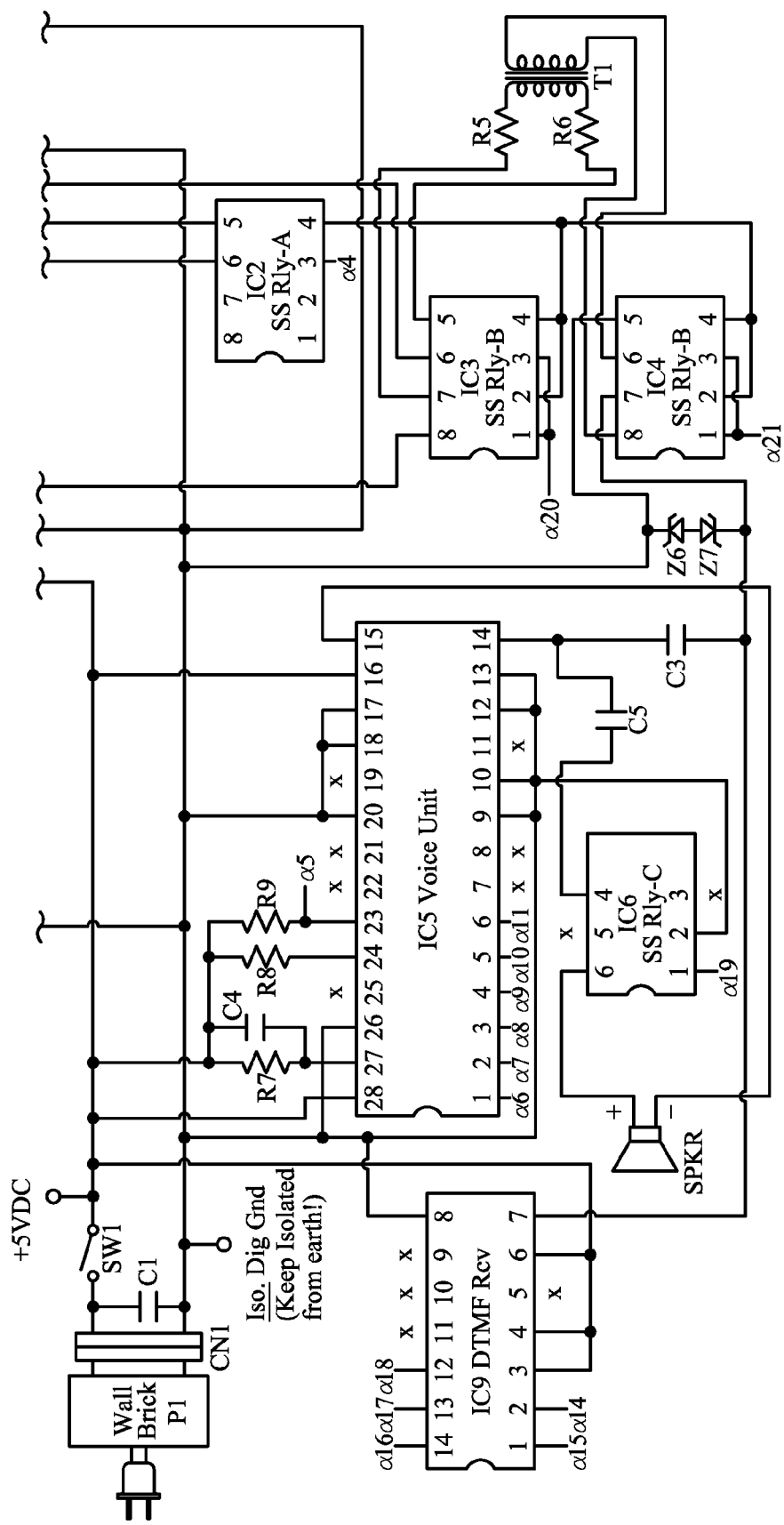
Figure 4:
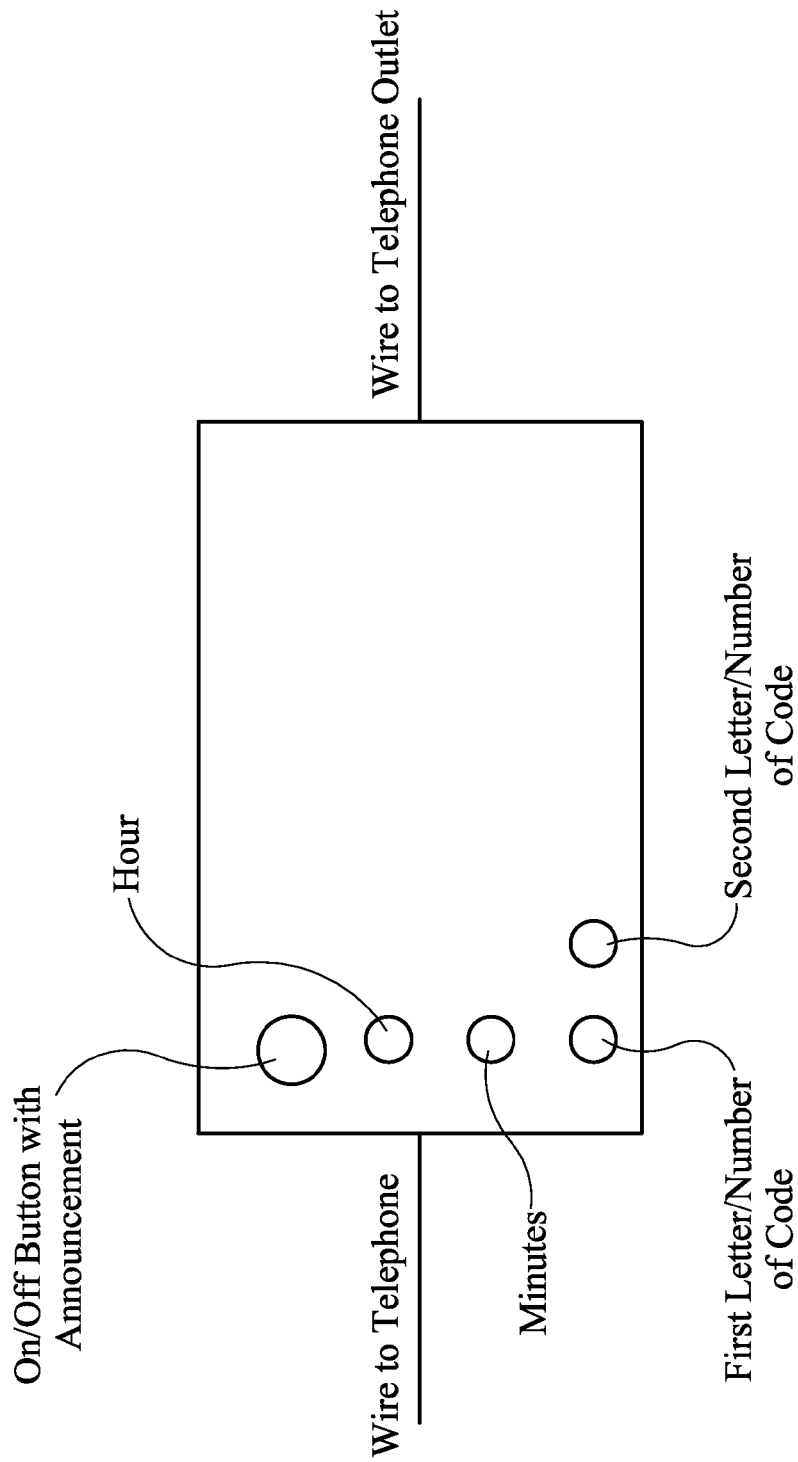
FIG. 4 is a pictorial illustration of one embodiment of an outer box for the telephone blocker with timer.

The drawings illustrate the preferred embodiment for the selective telephone call blocker of the present invention which generally has two modes of operation: (1) based on a user entering a reference time, which can be the current or present time, though such is not limiting, and a beginning "on" time (an optional day and/or date can also be entered, though such is not considered limiting) and in some instances an ending "on" time, and (2) if it's outside the time period, the device is not in a blocking mode and the phone line just works as per normal. The device can be programmed to be in a blocking mode for multiple periods of time during the day. This allows the user to set the time of day and then set several blocking on times and blocking off times, to allow the device to have interval periods where it would be in a blocking mode. A secret code can be entered or programmed for certain users so they can have their telephone calls get through.

One or more levels of code can be used or programmed with the present invention. For example, one code can be designated for callers who the user wishes to receive calls at any time. Another code could be designated to allow the caller to get through only during business hours (i.e. nine (9) to five (5), etc.). Another code can restrict the caller to a certain period. It is obvious that the various code combinations or uses are limitless and all are considered within the scope of the invention. If the caller has a correct code for certain periods, but is calling when outside of his or her designated period, a message can be provided to inform the caller that he or she is calling outside his or her designated period. Other similar audio/voice messages can be provided and all are considered within the scope of the invention. To achieve these features additional programming would preferably be performed.

When the device is in the blocking mode, the user's phone is preferably disconnected from the telephone line. The "line access switch" in the diagram, is shown in a pass through mode, which is the normal mode, the non-blocking mode. During certain selected times of day when the device is in its blocking mode, series switch 12 is open and the two other vertical switches 14 and 16 are closed.

Part of the invention looking at the telephone line is provided with a "ring detector" component such that if the user's number is dialed and rings, it will detect it. The detection is preferably under microprocessor control, and a communication line is provided between the ring detector and the microprocessor. The microprocessor controlled ring detector detects the ring and causes an output to switch the "answer" component to answer the phone line. Thus, as far as the phone company is concerned, the phone has been answered. Once answered, the "voice response unit" and DTMF receiver/tone receiver ("tone receiver") are activated and inform the caller that the user's phone is currently being blocked. The voice response unit and tone receiver then asks or requests that the caller enter the secret code for access for detection by the tone receiver.

If after a certain predefined timeout period, the tone receiver will go into the subsequent steps and if it doesn't get the correct code within the predefined or programmed time period, the voice unit preferably provides a message to the caller, such as "I'm sorry, we haven't received the correct code in the allotted time" and then preferably hangs up. Other messages are also considered within the scope of the invention, including, but not limited to, "good-bye" or just cutting off or disconnecting the caller. Any number of time periods can be used and all are considered within the scope of the invention. Additionally, the system can also be designed or programmed to disconnect the user, with or without a message, immediately upon receiving an incorrect code.

If the device does receive the correct code within the proper time, then it preferably indicates that the proper code has been received, such as by saying "thank you", etc., and it creates a localized ringing signal within the unit, as opposed to the user's phone, and to alert whoever may be in the household to answer the phone. Preferably the alerting is done through a speaker and speaker box. On the other side of the invention, "the phone side" answer detector circuitry is provided and is in communication with the microprocessor through the line access. Once localized ringing in the house begins the answer detector circuitry/component is used to detect when the user's phone has been picked up. Once answered, switch 12 is closed ("normal state"), and switches 14 and 16 are opened which connects the phone line back through as normally would be as if the present invention had not been there. Thus, at this point a normal conversation occurs, but only with callers who enter the correct code.

The hook detector component is provided to preferably determine when the caller and/or user on the line hangs up so the present invention can be reset, where the time of the hang up is still within the programmed or predefined blocking period. If the time is not within the blocking period, the device is not reset or activated and all calls pass through as normal (switch 12 closed and switches 14 and 16 opened). Where the device is on (blocking mode) and the user wishes to make a phone call, once the user's phone is picked up, it is detected through the answer detector, which causes the invention to restore the line, to normal, so that the user can make an outgoing call.

Push buttons can be provided, to allow the user to set the time of day, date and block out periods, similar to a clock radio. A display can be provided to allow the user to see the time of day and blocking settings, etc. An additional button can also be provided for manual activation/deactivation of the block out feature, without any programming.

An audio storage unit, in connection with a microphone, can also be provided and is in communication with the system, to allow the user to create an optional/personal announcement or message. The personal message will indicate to the callers that they have dialed the correct phone number.

The device can be provided with an on/off power switch and power supply circuitry. By preferably providing a separate speaker unit, as opposed to ringing the bell of the user's phone, only a relatively small AC signal is required, thus reducing the cost of the present invention. A buzzer, other sound producing device, remote beeper, can also be provided and in communication with the system to alert the user that a caller with the correct code is calling.

The coding concept of the invention uses the DTMF, the dual tone multifrequency, with the DTMF receiver detecting which buttons are pushed by the caller. The unit can be provided to work with one code, or a plurality of codes can be programmed. The invention preferably uses user issued codes, preferably unique to the user, such as a person's initials, though such is not considered limiting. Additionally, the system can be designed or programmed to have more than one correct code.

The above described invention can also be incorporated into an answering machine or the user's phone, or can be a stand alone device connected to the telephone line. It is also within the scope of the invention to use the blocking feature with a cellular telephone.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An incoming telephone call blocking device associated with a telephone line operatively associated with a user's telephone, said blocking device comprising:

means for setting an activation period for blocking of incoming telephone calls, said activation period including a user entered starting time for blocking of incoming telephone calls wherein when not in the activation period the user's telephone is connected with the telephone line through the closing of a series switch; wherein when blocking has been activated the user's telephone is disconnected from the telephone line by the opening of the series switch and closing of a first vertical switch and a second vertical switch;

means for requesting a caller during the activation period to enter a code for passing the incoming telephone calls;

means for determining if a correct code has been entered by the caller; and means for allowing an incoming telephone call of the caller to pass through during the activation period where it is determined that the caller has entered a correct code.

2. The telephone call blocking device of claim 1 further comprising a means for detecting an incoming telephone call when blocking has been activated.

3. The telephone call blocking device of claim 2 wherein said means for detecting is a ring detector in communication with the first vertical switch and with a microprocessor; wherein upon detection of an incoming telephone call by said ring detector said microprocessor activates said means for requesting by closing an answer switch which also answers the incoming telephone call.

4. The telephone call blocking device of claim 1 wherein said means for requesting is a voice response unit and a tone receiver which inform the caller that blocking has been activated and requests the caller to enter a code to allow the caller's incoming telephone call to pass through.

5. The telephone call blocking device of claim 1 further comprising means for disconnecting the incoming telephone call if the correct code has not been entered within a predetermined time period.

6. The telephone call blocking device of claim 1 further comprising means for alerting a person that an approved incoming telephone call has been received during the activation period, said means for alerting independent from a ringing bell of a user's phone.

7. The telephone call blocking device of claim 6 wherein said means for alerting is a speaker and means for producing an audible sound through said speaker, said speaker and means for producing independent from the ringing bell of the user's phone.

8. The telephone call blocking device of claim 6 further comprising means for detecting when the user's telephone is picked up to answer a passed incoming telephone call during the activation period, said means for detecting causing said series switch to close and said first vertical switch and said second vertical switch to open, which connects the previously disconnected user's telephone to the telephone line.

9. The telephone call blocking device of claim 1 wherein said activation period further including a user entered ending time for blocking of incoming telephone calls.

10. The telephone call blocking device of claim 8 further comprising means for reactivating blocking of incoming telephone calls once the user's telephone is hung up if still within the user entered activation period.

11. An incoming telephone call blocking device associated with a tele phone line operatively associated with a user's telephone, said blocking device comprising:

means for setting an activation period having a user entered beginning time and a user entered ending time for blocking of incoming telephone calls;

wherein when not in the activation period the user's telephone is connected with the telephone line through the closing of a series switch; wherein when blocking has been activated the user's telephone is disconnected from the telephone line by the opening of the series switch and closing of a first vertical switch and a second vertical switch;

a ring detector for sensing an incoming telephone call when blocking has been activated, said ring detector in communication with the telephone line througha the first verticalswitch which is in a closed position when blocking is at least initially activated;

a microprocessor in communication with said ring detector;

means for requesting a caller to enter a code for passing the incoming telephone call, wherein upon detection of an incoming telephone call by said ring detector said microprocessor activates said means for requesting by closing an answer switch which also answers the incoming telephone call;

means for determining if a correct code has been entered by the caller;

means for allowing an incoming telephone call of the caller to pass through where it is determined that the caller has entered a correct code;

means for disconnecting the incoming telephone call if the correct code has not been entered within a predetermined time period;

a speaker;

means for generating an audible sound through said speaker to inform a user that an incoming telephone call has been passed through, said means for generating independent from a ringing bell of a user's phone; and means for detecting when the user's telephone is picked up to answer a passed incoming telephone call during the activation period, said means for detecting causing said series switch to close and said first vertical switch and said second vertical switch to open, which connects the previously disconnected user's telephone to the telephone line.

12. The telephone call blocking device of claim 11 wherein said means for requesting is a voice response unit and a tone receiver which inform the caller that blocking has been activated and request the caller to enter a code to allow the caller's incoming telephone call to pass through.

13. The telephone call blocking device of claim 11 wherein said activation period including one or more user entered dates.

* * * * *